(12) United States Patent
Larsson et al.

(10) Patent No.: US 11,267,479 B2
(45) Date of Patent: Mar. 8, 2022

(54) METHOD AND SYSTEM FOR DETERMINING WHETHER THE DRIVER OF A VEHICLE IS HOLDING THE STEERING WHEEL

(71) Applicant: Scania CV AB, Södertälje (SE)

(72) Inventors: Christian Larsson, Stockholm (SE); Robin Andersson, Stockholm (SE); Linus Bredberg, Tullinge (SE)

(73) Assignee: SCANIA CV AB

( * ) Notice: Subject to any disclaimer, the term of this patent is extended or adjusted under 35 U.S.C. 154(b) by 374 days.

(21) Appl. No.: 16/303,716

(22) PCT Filed: Apr. 28, 2017

(86) PCT No.: PCT/SE2017/050419
§ 371 (c)(1),
(2) Date: Nov. 21, 2018

(87) PCT Pub. No.: WO2017/209674
PCT Pub. Date: Dec. 7, 2017

(65) Prior Publication Data
US 2020/0391753 A1  Dec. 17, 2020

(30) Foreign Application Priority Data
Jun. 2, 2016 (SE) .................. 1650771-7

(51) Int. Cl.
*B60W 40/09* (2012.01)
*B60W 50/16* (2020.01)
(Continued)

(52) U.S. Cl.
CPC ............ *B60W 40/09* (2013.01); *B60W 50/16* (2013.01); *B60W 2040/0818* (2013.01); *B60W 2050/146* (2013.01); *B60W 2540/18* (2013.01)

(58) Field of Classification Search
CPC .. B60W 40/09; B60W 50/16; B60W 2540/18; B60W 2050/146; B60W 2040/0818; B60W 2050/0057
See application file for complete search history.

(56) References Cited

U.S. PATENT DOCUMENTS

| 8,880,287 B2 | 11/2014 | Lee |
| 9,096,262 B2 | 8/2015 | Urhahne |

(Continued)

FOREIGN PATENT DOCUMENTS

| CN | 103025560 A | 4/2013 |
| CN | 103419840 A | 12/2013 |

(Continued)

OTHER PUBLICATIONS

Saeed V. Vaseghi, "Power Spectrum and Correlation" Chapter 9 of Advanced Digital Signal Processing and Noise Reduction, 2nd. Ed,(2000), pp. 263-296 (Year: 2000).*

(Continued)

*Primary Examiner* — Peter D Nolan
*Assistant Examiner* — Tanya C Sienko
(74) *Attorney, Agent, or Firm* — Ostrolenk Faber LLP

(57) ABSTRACT

A method for determining whether the driver of a vehicle is holding the steering wheel includes steps of repeatedly determining (S1) the steering wheel angle, repeatedly determining (S2) an error value based on a current determined steering wheel angle value and a previously determined steering wheel angle value; comparing (S3) a determined current error value with previously determined error values to determine a correlation between the error values; determining (S4a) that the driver is holding the steering wheel if the correlation between the error values is above a threshold value or if the driver is not holding the steering wheel if the correlation between the error values is below a threshold (Continued)

value. Also, a system for determining whether the driver of a vehicle is holding the steering wheel by performing the method. Also a computer program and a computer program product for practicing the method.

13 Claims, 3 Drawing Sheets

(51) Int. Cl.
*B60W 40/08* (2012.01)
*B60W 50/14* (2020.01)

(56) References Cited

U.S. PATENT DOCUMENTS

| 9,604,647 | B2 | 3/2017 | Ganesch | |
|---|---|---|---|---|
| 2007/0137921 | A1 | 6/2007 | Kasahara | 180/405 |
| 2010/0131233 | A1 | 5/2010 | Deng et al. | 702/151 |
| 2010/0228417 | A1 | 9/2010 | Lee et al. | 701/23 |
| 2011/0266396 | A1 | 11/2011 | Abildgaard et al. | 244/223 |
| 2012/0169503 | A1* | 7/2012 | Wu | G08B 21/06 340/575 |
| 2013/0015010 | A1* | 1/2013 | Junge | B60K 28/066 180/272 |
| 2013/0304326 | A1* | 11/2013 | Van Dongen | G06F 7/00 701/42 |
| 2013/0317699 | A1 | 11/2013 | Urhahne | 701/41 |
| 2014/0257628 | A1 | 9/2014 | Lee et al. | 701/34.4 |
| 2014/0371989 | A1 | 12/2014 | Trimboli et al. | 701/41 |
| 2016/0001814 | A1 | 1/2016 | Endo et al. | |
| 2016/0152239 | A1* | 6/2016 | Kondoh | B60W 40/08 701/1 |

FOREIGN PATENT DOCUMENTS

| CN | 104029683 A | | 9/2014 | |
|---|---|---|---|---|
| JP | 2010-202048 | * | 9/2010 | B62D 1/04 |
| JP | 2010202048 A | * | 9/2010 | |

OTHER PUBLICATIONS

A. Giusti, C. Zocchi, and A. Rovetta. "A Noninvasive System for Evaluating Driver Vigilance Level Examining Bother Physiological and Mechanical Data" IEEE Transactions on Intelligent Transportation Systems, vol. 10, No. 1, Mar. 2009 (Year: 2009).*

T. Pilluti and A. Ulsoy "Identificition of Driver State for Lane-Keeping Tasks" IEEE Transactions on Systems, Man, and Cybernetics—Part A: Systems and Humans, vol. 29, No. 5, Sep. 1999 pp. 486-502 (Year: 1999).*

International Search Report dated Jun. 29, 2017 in corresponding PCT International Application No. PCT/SE2017/050419.

Written Opinion dated Jun. 29, 2017 in corresponding PCT International Application No. PCT/SE2017/050419.

Office Action dated Dec. 27, 2016 in corresponding Swedish Patent Application No. 1650771-7.

Chinese Office Action, dated Dec. 2, 2020, issued in corresponding Chinese Patent Application No. 201780032418.2. English Translation. Total 8 pages.

* cited by examiner

METHOD AND SYSTEM FOR DETERMINING WHETHER THE DRIVER OF A VEHICLE IS HOLDING THE STEERING WHEEL

CROSS-REFERENCE TO RELATED APPLICATIONS

The present application is a 35 U.S.C. §§ 371 national phase conversion of PCT/SE2017/050419, filed Apr. 28, 2017, which claims priority of Swedish Patent Application No. 1650771-7, filed Jun. 2, 2016, the contents of which are incorporated by reference herein. The PCT International Application was published in the English language.

TECHNICAL FIELD

The invention relates to a method for determining whether the driver of a vehicle is holding the steering wheel. The invention also relates to a system for determining whether the driver of a vehicle is holding the steering wheel. The invention also relates to a vehicle with the system. The invention in addition relates to a computer program and a computer program product for practicing the method.

BACKGROUND ART

In order to facilitate driving and improve safety, it may be desired to provide methods to determine whether the driver of a vehicle is holding the steering wheel. For example, when advanced drivers assistance functions are used to aid the driver in steering the vehicle, it is desirable to know that the driver is holding the steering wheel and ready to take over control of the vehicle.

Detecting that the driver is holding the steering wheel using angular sensors is difficult, partly due to different driving styles of different drivers. Some drivers use large corrective interventions at longer intervals while others continuously use smaller steering corrections. Furthermore, uneven roads and different road grades induce very different disturbance levels in typical angular sensors. The contribution from road disturbance and internal sensor noise may even mask driver input at times. These factors make it difficult to determine if the driver is holding the steering wheel by considering the temporal properties of the measurements.

US20140257628 discloses a method and system for detecting whether a vehicle driver is holding a steering wheel of the vehicle. The system monitors steering torque and steering angle signals, determines a resonant frequency of oscillation of the steering system from the measured data, and compares the resonant frequency to a known natural frequency of the steering. If the resonant frequency is lower than the known natural frequency, the system determines that the driver is holding the steering wheel.

There is however a need to further simplify determining whether a driver of a vehicle is holding the steering wheel.

OBJECTS OF THE INVENTION

An object of the present invention is to provide a method for determining whether the driver of a vehicle is holding the steering wheel which is simple and reliable.

Another object of the present invention is to provide a system for determining whether the driver of a vehicle is holding the steering wheel which is simple and reliable.

SUMMARY OF THE INVENTION

These and other objects, apparent from the following description, are achieved by a method, a system, a vehicle, a computer program and a computer program product disclosed herein. Preferred embodiments of the method and the system are disclosed.

Specifically an object of the invention is achieved by a method for determining whether the driver of a vehicle is holding the steering wheel. The method comprises the step of repeatedly determining the steering wheel angle. The method further comprises the steps of: repeatedly determining an error value based on the current determined steering wheel angle value and a previously determined steering wheel angle value; and comparing a determined current error value with previously determined error values to determine a correlation between the error values. If the correlation between the error values is above a threshold value, it is determined that the driver is holding the steering wheel.

The step of repeatedly determining the steering wheel angle is performed continuously or intermittently. The step of determining the steering wheel angle is performed by means of one or more steering wheel angle sensor units/steering wheel angle sensors.

The step of repeatedly determining an error value based upon the current determined steering wheel angle value is performed continuously or intermittently. The step of repeatedly determining an error value comprises utilizing calculation means for determining the error value constituting the unknown effect on the steering wheel angle from the driver and noise sources. The steering wheel angle can be described by:

$$\omega(t)=a\omega(t-1)+\epsilon(t)$$

where $\epsilon(t)$ is the error value, i.e. the unknown effect on the angle from the driver and the noise sources.

Thus, the frequency properties of steering corrections made by a driver holding the steering wheel differ significantly from the frequency properties transferred from the road or by sensor noise. This makes it possible to efficiently determine whether a driver is holding the steering wheel by thus considering the correlation properties of the steering wheel angle measurements. In order to determine whether the driver is holding the steering wheel, the possible correlation between error values is determined, i.e. the correlation properties of the steering wheel angle are measured.

By thus comparing determined current error value with previously determined error values so as to determine whether there is a certain correlation between the error values, a simple and reliable way of determining whether the driver is holding the steering wheel is hereby obtained. This facilitates determining whether the driver is holding the steering wheel by means of only detecting the steering wheel angle and thus the only sensor required is a steering wheel angle sensor which is generally available. Information regarding steering torque is not required and thus no steering torque sensor is required. By thus determining possible correlation between error values, a high detection rate may be obtained with lower risk of false detection and thus higher accuracy may be obtained in a simple and cost efficient way.

According to an embodiment of the method, the step of comparing the current determined error value with previously determined error values is based on a correlation function. Using a correlation function provides an efficient way of processing the information regarding error values so as to efficiently determine possible correlation between the error values. The correlation function may be expressed as follows:

$$r(t,\tau)=E\{\epsilon(t)\epsilon(t-\tau)\}.$$

The road and sensor noises are typically white, which means that when the driver is not holding the steering wheel the auto-correlation is $$r(t,\tau) = \begin{cases} \lambda(t), & \text{if } \tau = 0, \\ 0, & \text{if } \tau = 1, 2, \ldots \end{cases}$$

On the other hand, when the driver is holding the steering wheel, the auto-correlation is in general non-zero also for $\tau \neq 0$.

According to an embodiment of the method, the correlation function is based on the product of error values summarized for a pre-determined number of repetitions. Hereby an efficient way of practically processing information of error values in a correlation function is obtained.

According to an embodiment, the method comprises the step of, if the correlation is below a threshold value, determining that the driver is not holding the steering wheel. Hereby the fact the driver is not holding the steering wheel may be easily and efficiently determined.

A detection function may be constructed based upon the correlation function so as to determine whether the driver is holding the steering wheel. Such a detection function may be arranged to repeatedly measure whether the driver is holding the steering wheel. The detection function may be expressed as follows:

$$f(t,r(t,\tau))$$

The detection function may give different values depending on for how long a driver has been not holding the steering wheel.

According to an embodiment, the method comprises the step of taking action based upon whether the driver is holding the steering wheel. The step of taking action based upon whether the driver is holding the steering wheel comprises adapting the action based upon if and for how long the driver is not holding the steering wheel.

The step of taking action if the driver is not holding the steering wheel comprises, according to an embodiment, providing a warning to the driver. The step of providing a warning may comprise visually presenting a warning such as a displaying a warning on a display unit of the vehicle and/or providing a sound warning such as an alarm and/or a voice message and/or providing a tactile warning such as vibrating the driver seat. The step of taking action based upon whether the driver is holding the steering wheel may comprise controlling driving of the vehicle which may comprise activating steering control and/or speed control which may involve bringing the vehicle to a safe halt depending on the situation.

By thus taking action if the driver is not holding the steering wheel, safety is improved.

Specifically, an object of the invention is achieved by a system for determining whether the driver of a vehicle is holding the steering wheel. The system comprises means for repeatedly determining the steering wheel angle. The system further comprise means for repeatedly determining an error value based on the current determined steering wheel angle value and a previously determined steering wheel angle value; and means for comparing determined current error value with previously determined error values to determine a correlation between the error values. The system comprises means for determining that the driver is holding the steering wheel if correlation between the error values is above a threshold value.

According to an embodiment of the system, the means for comparing the current determined error value with previously determined error values is based on a correlation function.

According to an embodiment of the system, the correlation function is based on the product of error values summarized for a pre-determined number of repetitions.

According to an embodiment, the system comprises means for determining that the driver is not holding the steering wheel if the correlation between the error values is below a threshold value.

The system for determining whether the driver of a vehicle is holding the steering wheel is configured to perform the methods as set out herein.

Specifically an object of the invention is achieved by a vehicle comprising a system according to the invention as set out herein.

Specifically an object of the invention is achieved by a computer program for determining whether the driver of a vehicle is holding the steering wheel. The computer program comprises program code which, when run on an electronic control unit or another computer connected to the electronic control unit, causes the electronic control unit to perform methods as set out herein.

Specifically an object of the invention is achieved by a computer program product comprising a digital storage medium storing the computer program.

BRIEF DESCRIPTION OF THE DRAWINGS

For a better understanding of the present invention reference is made to the following detailed description when read in conjunction with the accompanying drawings, wherein like reference characters refer to like parts throughout the several views, and in which.

DETAILED DESCRIPTION OF AN EMBODIMENT

Hereinafter the term "link" refers to a communication link which may be a physical connector, such as an optoelectronic communication wire, or a non-physical connector such as a wireless connection, for example a radio or microwave link.

Figure 1:
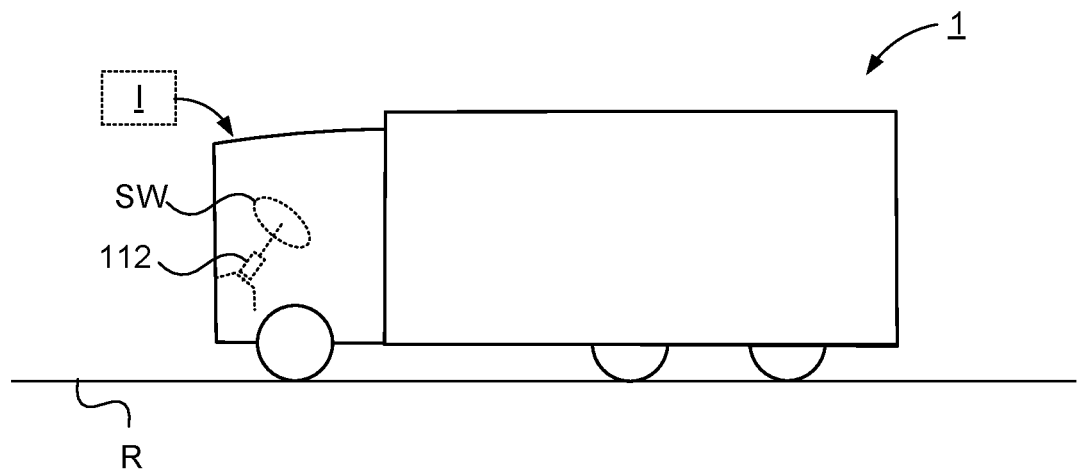
FIG. 1 schematically illustrates a side view of a vehicle according to the present invention.

FIG. 1 schematically illustrates a side view of a vehicle 1 according to the present invention. The exemplified vehicle 1 is a heavy vehicle in the shape of a truck. The vehicle according to the present invention could be any suitable vehicle, such as a bus or a car. The vehicle 1 comprises a steering wheel SW. A sensor unit 112 is connected to the steering wheel SW to detect the steering angle. The vehicle is travelling on a road R. The vehicle 1 comprises a system I for determining whether the driver of a vehicle is holding the steering wheel.

Figure 2:
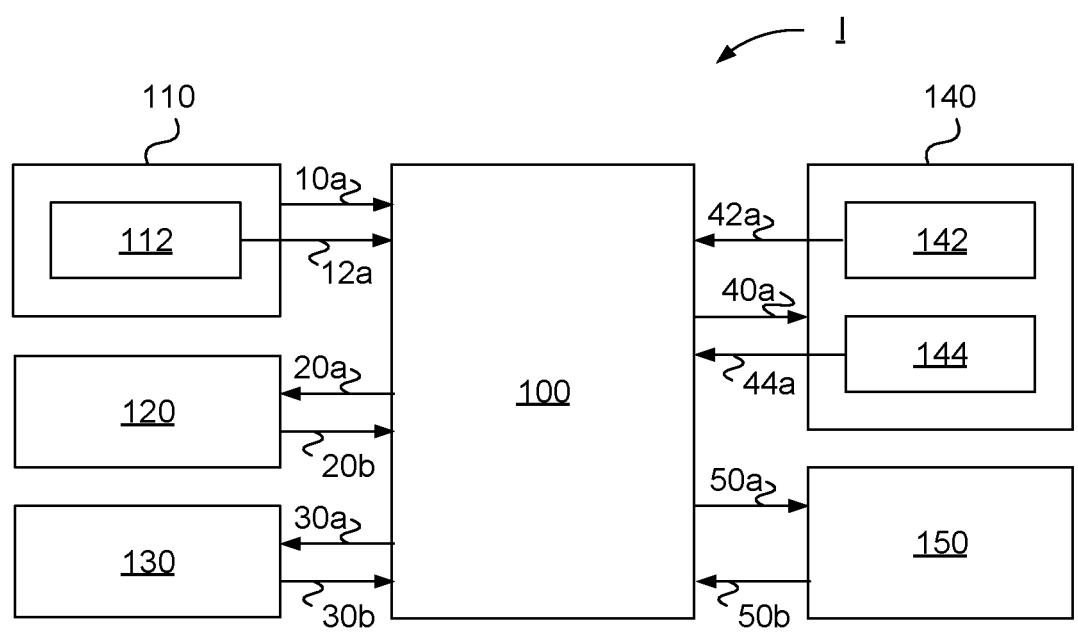
FIG. 2 schematically illustrates a block diagram of a system for determining whether the driver of a vehicle is holding the steering wheel according to an embodiment of the present invention.

FIG. 2 schematically illustrates a block diagram of a system I for determining whether the driver of a vehicle is holding the steering wheel according to an embodiment of the present invention.

The system I comprises an electronic control unit 100.

The system I comprises means 110 for repeatedly determining the steering wheel angle. The means 110 for repeatedly determining the steering wheel angle comprises one or more steering angle sensor units 112.

The system I comprises means 120 for repeatedly determining an error value based upon the current determined steering wheel angle value and a previously determined steering wheel angle value.

The current steering wheel angle can be described by:

$$\omega(t)=a\omega(t-1)+\epsilon(t),$$

where ω(t) is the current steering angle, ω(t−1) is the previous steering angle, a is a real valued scalar and ϵ(t) is the unknown effect on the steering angle from the driver and the noise sources. ϵ(t) has been denoted as the error value and may thus be determined based upon the current determined steering wheel angle value and a previously determined steering wheel angle value.

The means 120 for repeatedly determining an error value based upon the current determined steering wheel angle value and a previously determined steering wheel angle value may comprise any suitable calculation means. The means 120 is according to an embodiment comprised in the electronic control unit 100.

The system I comprises means 130 for comparing determined current error value with previously determined error values so as to determine whether there is a certain correlation between the error values.

According to an embodiment of the system the means 130 for comparing current determined error value with previously determined error values is based upon a correlation function. The correlation function r(t, τ) may theoretically be expressed as follows:

$$r(t,\tau)=E\{\epsilon(t)\epsilon(t-\tau)\}$$

where E is the expectation operator with respect to the probability space generated by the process ϵ(t). The road and sensor noises are typically white, which means that when the driver is not holding the steering wheel the auto-correlation is:

$$r(t,\tau)=\begin{cases}\lambda(t), & \text{if } \tau=0,\\ 0, & \text{if } \tau=1,2,\ldots\end{cases}$$

On the other hand, when the driver is holding the steering wheel, the auto-correlation is in general non-zero also for τ≠0. Consequently, it is possible to construct a detection function ƒ(t, r(t, τ)) that measures if the driver is holding the steering wheel or not.

According to an embodiment of the system the correlation function is based upon the product of error values summarized for a certain number of repetitions. Below a practical implementation of the correlation function r is shown based upon the product of error values E summarized for N number of error values, where the driver of the vehicle is not holding on to the steering wheel:

$$r(t,0)=\sum_{k=t}^{t-N}\epsilon(k)\epsilon(k)=\lambda_\epsilon$$

$$r(t,1)=\sum_{k=t}^{t-N}\epsilon(k)\epsilon(k-1)\approx 0$$

$$r(t,2)=\sum_{k=t}^{t-N}\epsilon(k)\epsilon(k-2)\approx 0$$

$$\vdots$$

$$r(t,M)=\sum_{k=t}^{t-N}\epsilon(k)\epsilon(k-M)\approx 0$$

When the driver is not holding on to the steering wheel as is the case in this example, there will be a non-correlation between the error values which according to the correlation function based upon the product of error values summarized for N number of repetitions will be approximately zero for all repetitions backward but not for the current error value, i.e. not for r(t, 0).

If the driver is not holding the steering wheel, there will be a non-correlation of the error values which may be determined according to above. Thus, if there is a non-correlation between the error values, it will be taken as an indication that the driver is not holding the steering wheel.

The system I comprises means 140 for determining whether the driver is holding the steering wheel based upon possible correlation between the thus determined error values.

The means 140 for determining whether the driver is holding the steering wheel based upon possible correlation between the thus determined error values may comprise any suitable processing means. The means 140 is according to an embodiment comprised in the electronic control unit 100. The means 140 for determining whether the driver is holding the steering wheel based upon possible correlation between the thus determined error values comprises processing means that may comprise a database for certain correlation from which database the possible correlation may be determined.

The means 140 for determining whether the driver is holding the steering wheel based upon possible correlation between the thus determined error values may comprise the detection function ƒ(t, r(t, τ)) that measures if the driver is holding the steering wheel or not.

The means 140 for determining whether the driver is holding the steering wheel based upon possible correlation between the thus determined error values comprises means 142 for taking a certain correlation between the error values as an indication that the driver is holding the steering wheel.

The system I thus comprises means 142 for taking a certain correlation between the error values as an indication that the driver is holding the steering wheel.

The means 140 for determining whether the driver is holding the steering wheel based upon possible correlation between the thus determined error values comprises means 144 for taking a substantially non-correlation as an indication that the driver is not holding the steering wheel.

The system I thus comprises means 144 for taking a substantially non-correlation as an indication that the driver is not holding the steering wheel.

The system I comprises according to an embodiment means 150 for taking action based upon whether the driver is holding the steering wheel.

The means 150 for taking action based upon whether the driver is holding the steering wheel may, if it is determined that the driver is not holding the steering wheel, be any suitable action. Such action may comprise presenting a warning to the driver. The means 150 for taking action based upon whether the driver is holding the steering wheel may thus comprise means for presenting a warning to the driver that the driver is not holding the steering wheel. The means for presenting a warning may be visual means such as a display unit and/or sound means such as an alarm and/or a voice message and/or tactile means such as vibrations in the driver seat. The means 150 for taking action based upon whether the driver is holding the steering wheel may thus comprise means controlling driving of the vehicle which may comprise activation of steering control and/or speed control which may involve bringing the vehicle to a safe halt depending on the situation.

The electronic control unit 100 is operably connected to the means 110 for repeatedly determining the steering wheel angle via a link 10a. The electronic control unit 100 is via the link 10a arranged to receive a signal from the means 110 representing data for steering wheel angle.

The electronic control unit 100 is operably connected to the steering angle sensor unit 112 for repeatedly determining the steering wheel angle via a link 12a. The electronic control unit 100 is via the link 12a arranged to receive a signal from the means 110 representing data for steering wheel angle.

The electronic control unit 100 is operably connected to the means 120 for repeatedly determining an error value based upon the current determined steering wheel angle value and a previously determined steering wheel angle value via a link 20a. The electronic control unit 100 is via the link 20a arranged to send a signal to the means 120 representing data for previous and current steering wheel angle.

The electronic control unit 100 is operably connected to the means 120 for repeatedly determining an error value based upon the current determined steering wheel angle value and a previously determined steering wheel angle value via a link 20b. The electronic control unit 100 is via the link 20b arranged to receive a signal from the means 120 representing data for error value based upon the current determined steering wheel angle value and a previously determined steering wheel angle value.

The electronic control unit 100 is operably connected to the means 130 for comparing determined current error value with previously determined error values so as to determine whether there is a certain correlation between the error values via a link 30a. The electronic control unit 100 is via the link 30a arranged to send a signal to the means 130 representing data for previous and current error values.

The electronic control unit 100 is operably connected to the means 130 for comparing determined current error value with previously determined error values so as to determine whether there is a certain correlation between the error values via a link 30b. The electronic control unit 100 is via the link 30b arranged to receive a signal from the means 130 representing data for comparison of error values.

The electronic control unit 100 is operably connected to the means 140 for determining whether the driver is holding the steering wheel based upon possible correlation between the thus determined error values via a link 40a. The electronic control unit 100 is via the link 40a arranged to send a signal to the means 140 representing data for correlation between the thus determined error values.

The electronic control unit 100 is operably connected to the means 142 for taking a certain correlation between the error values as an indication that the driver is holding the steering wheel via a link 42a. The electronic control unit 100 is via the link 42a arranged to receive a signal from the means 142 representing data for indication that the driver is holding the steering wheel.

The electronic control unit 100 is operably connected to the means 144 for taking a substantially non-correlation as an indication that the driver is not holding the steering wheel via a link 44a. The electronic control unit 100 is via the link 44a arranged to receive a signal from the means 144 representing data for indication that the driver is not holding the steering wheel.

The electronic control unit 100 is operably connected to the means 150 for taking action based upon whether the driver is holding the steering wheel via a link 50a. The electronic control unit 100 is via the link 50a arranged to send a signal to the means 150 representing data for indication that the driver is not holding the steering wheel.

The electronic control unit 100 is operably connected to the means 150 for taking action based upon whether the driver is holding the steering wheel via a link 50b. The electronic control unit 100 is via the link 50b arranged to receive a signal from the means 150 representing data for action based upon indication that the driver is not holding the steering wheel.

Figure 3:
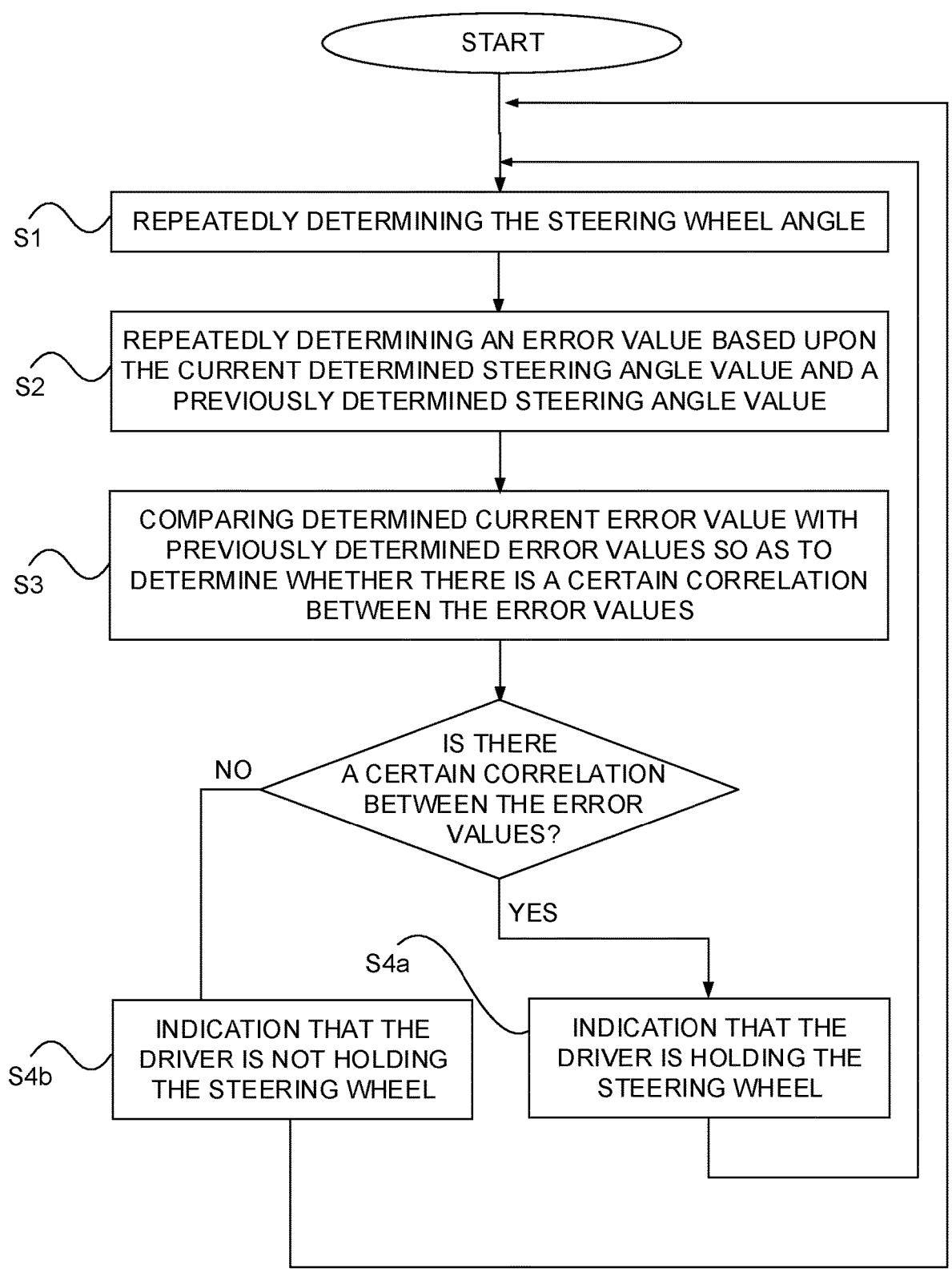
FIG. 3 schematically illustrates a block diagram of a method for determining whether the driver of a vehicle is holding the steering wheel according to an embodiment of the present invention.

FIG. 3 schematically illustrates a block diagram of a method for determining whether the driver of a vehicle is holding the steering wheel according to an embodiment of the present invention.

According to the embodiment, the method for determining whether the driver of a vehicle is holding the steering wheel comprises a step S1. In this step the steering wheel angle is repeatedly determined.

According to the embodiment the method for determining whether the driver of a vehicle is holding the steering wheel comprises a step S2. In this step an error value based upon the current determined steering wheel angle value and a previously determined steering wheel angle value.

According to the embodiment the method for determining whether the driver of a vehicle is holding the steering wheel comprises a step S3. In this step determined current error value is compared with previously determined error values so as to determine whether there is a certain correlation between the error values.

According to the embodiment the method for determining whether the driver of a vehicle is holding the steering wheel comprises a step S4a. In this step a certain correlation between the error values is taken as an indication that the driver is holding the steering wheel.

According to the embodiment the method for determining whether the driver of a vehicle is holding the steering wheel comprises a step S4b. In this step a substantially non-correlation is taken as an indication that the driver is not holding the steering wheel.

The step of repeatedly determining the steering wheel angle is performed continuously or intermittently. The step of determining the steering wheel angle is performed by means of one or more steering wheel angle sensor units/steering wheel angle sensors.

The step of repeatedly determining an error value based upon the current determined steering wheel angle value is performed continuously or intermittently. The step of repeatedly determining an error value comprises utilizing calculation means for determining the error value constituting the unknown effect on the steering wheel angle from the driver and noise sources. The steering wheel angle can be described by:

$$\omega(t)=a\omega(t-1)+\epsilon(t)$$

where $\epsilon(t)$ is the error value, i.e. the unknown effect on the angle from the driver and the noise sources.

Thus, the correlation properties of steering corrections made by a driver holding the steering wheel differ significantly from the frequency properties transferred from the road or by sensor noise. This makes it possible to efficiently determine whether a driver is holding the steering wheel by thus considering the spectral properties of the steering wheel angle measurements. In order to determine whether the driver is holding the steering wheel, the possible correlation between error values is determined, i.e. the correlation properties of the steering wheel angle are measured.

According to an embodiment of the method, the step of comparing current determined error value with previously determined error values is based upon a correlation function. Using a correlation function provides an efficient way of processing the information regarding error values so as to efficiently determine possible correlation between the error values. The correlation function may be expressed as follows:

$$r(t,\tau)=E\{\epsilon(t)\epsilon(t-\tau)\}.$$

The road and sensor noises are typically white, which means that when the driver is not holding the steering wheel the auto-correlation is $$r(t,\tau) = \begin{cases} \lambda(t), & \text{if } \tau = 0, \\ 0, & \text{if } \tau = 1, 2, \ldots \end{cases}$$

On the other hand, when the driver is holding the steering wheel, the auto-correlation is in general non-zero also for $\tau \neq 0$.

According to an embodiment of the method the correlation function is based upon the product of error values summarized for a certain number of repetitions.

According to an embodiment the method comprises the step of, if there is a substantially non-correlation, taking this as an indication that the driver is not holding the steering wheel.

A detection function may be constructed based upon the correlation function so as to determine whether the driver is holding the steering wheel. Such a detection function may be arranged to repeatedly measure whether the driver is holding the steering wheel. The detection function may be expressed as follows:

$$f(t,r(t,\tau))$$

The detection function may give different values depending on for how long a driver has been not holding the steering wheel.

According to an embodiment the method comprises the step of taking action based upon whether the driver is holding the steering wheel. The step of taking action based upon whether the driver is holding the steering wheel comprises adapting the action based upon if and for how long the driver is not holding the steering wheel.

The step of taking action if the driver is not holding the steering wheel comprises according to an embodiment providing a warning to the driver. The step of providing a warning may comprise visually presenting a warning such as a displaying a warning on a display unit of the vehicle and/or providing a sound warning such as an alarm and/or a voice message and/or providing a tactile warning such as vibrating the driver seat. The step of taking action based upon whether the driver is holding the steering wheel may comprise controlling driving of the vehicle which may comprise activating steering control and/or speed control which may involve bringing the vehicle to a safe halt depending on the situation.

Figure 4:
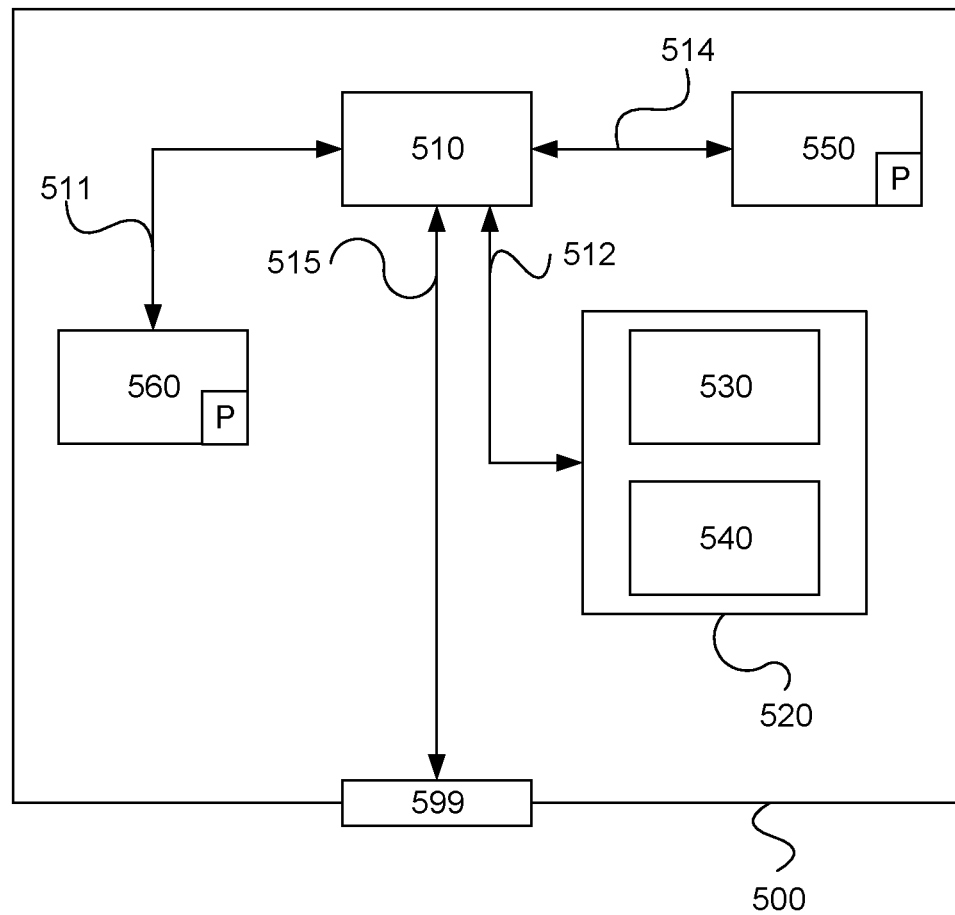
FIG. 4 schematically illustrates a computer according to an embodiment of the present invention.

With reference to FIG. 4, a diagram of an apparatus 500 is shown. The control unit 100 described with reference to FIG. 3 may according to an embodiment comprise apparatus 500. Apparatus 500 comprises a non-volatile memory 520, a data processing device 510 and a read/write memory 550. Non-volatile memory 520 has a first memory portion 530 wherein a computer program, such as an operating system, is stored for controlling the function of apparatus 500. Further, apparatus 500 comprises a bus controller, a serial communication port, I/O-means, an ND-converter, a time date entry and transmission unit, an event counter and an interrupt controller (not shown). Non-volatile memory 520 also has a second memory portion 540.

A computer program P is provided comprising routines for determining whether the driver of a vehicle is holding the steering wheel. The program P comprises routines for repeatedly determining the steering wheel angle. The program P comprises routines for repeatedly determining an error value based upon the current determined steering wheel angle value and a previously determined steering wheel angle value. The program P comprises routines for comparing determined current error value with previously determined error values so as to determine whether there is a certain correlation between the error values. The program P comprises routines for taking a certain correlation between the error values as an indication that the driver is holding the steering wheel. The routines for comparing current determined error value with previously determined error values are based upon a correlation function. The correlation function is based upon the product of error values summarized for a certain number of repetitions. The program P comprises routines for taking a substantially non-correlation as an indication that the driver is not holding the steering wheel. The computer program P may be stored in an executable manner or in a compressed condition in a separate memory 560 and/or in read/write memory 550.

When it is stated that data processing device 510 performs a certain function, it should be understood that data processing device 510 performs a certain part of the program which is stored in separate memory 560, or a certain part of the program which is stored in read/write memory 550.

Data processing device 510 may communicate with a data communications port 599 by means of a data bus 515. Non-volatile memory 520 is adapted for communication with data processing device 510 via a data bus 512. Separate memory 560 is adapted for communication with data processing device 510 via a data bus 511. Read/write memory 550 is adapted for communication with data processing device 510 via a data bus 514. To the data communications port 599 e.g. the links connected to the control units 100 may be connected.

When data is received on data port 599 it is temporarily stored in second memory portion 540. When the received input data has been temporarily stored, data processing device 510 is set up to perform execution of code in a manner described above. The signals received on data port 599 can be used by apparatus 500 for repeatedly determining the steering wheel angle. The signals received on data port

599 can be used by apparatus 500 for repeatedly determining an error value based upon the current determined steering wheel angle value and a previously determined steering wheel angle value. The signals received on data port 599 can be used by apparatus 500 for comparing determined current error value with previously determined error values so as to determine whether there is a certain correlation between the error values. The signals received on data port 599 can be used by apparatus 500 for taking a certain correlation between the error values as an indication that the driver is holding the steering wheel. The signals used for comparing current determined error value with previously determined error values are based upon a correlation function. The correlation function is based upon the product of error values summarized for a certain number of repetitions. The signals received on data port 599 can be used by apparatus 500 for taking a substantially non-correlation as an indication that the driver is not holding the steering wheel.

Parts of the methods described herein can be performed by apparatus 500 by means of data processing device 510 running the program stored in separate memory 560 or read/write memory 550. When apparatus 500 runs the program, parts of the methods described herein are executed.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. A method for determining whether a driver of a vehicle is holding a steering wheel of the vehicle, comprising the steps of:
    repeatedly determining steering wheel angle values with at least one steering angle sensor of the vehicle;
    repeatedly determining the driver's unknown effect on the steering wheel, and road and internal sensor noises by calculating an error value based on a current determined steering wheel angle value determined by the at least one steering angle sensor and a determined steering wheel angle value preceding the current determined steering wheel angle value determined by the at least one steering angle sensor;
    with a correlation function, comparing a determined current error value with previously determined error values to determine a correlation between the error values;
    if the correlation between the error values is above a first threshold value, determining that the driver is holding the steering wheel;
    if the correlation is below a second threshold value, determining that the driver is not holding the steering wheel; and
    providing a signal to the driver when the correlation is below the second threshold value.

2. A method according to claim 1, wherein the step of comparing the current determined error value with previously determined error values is based on a correlation function.

3. A method according to claim 1, wherein the correlation function is based on the product of error values summarized for a pre-determined number of repetitions.

4. A computer program product for determining whether a driver of a vehicle is holding a steering wheel of the vehicle;
    the product comprising a non-transitory storage medium on which a computer program comprising computer product code is recorded, the computer program is such that when the code is run on an electronic control unit or on another computer connected to the electronic control unit, that causes the electronic control unit to perform the steps according to claim 1.

5. A method according to claim 1, wherein the correlation below a threshold value is a non-correlation of wheel angle values.

6. A method according to claim 1, further comprising storing the determined steering wheel angles; and
    storing the current determined steering wheel angles and the previously determined steering wheel angle value.

7. A system (I) for determining whether a driver of a vehicle is holding a steering wheel of the vehicle, comprising:
    means for repeatedly determining steering wheel angle values;
    means for repeatedly determining the driver's unknown effect on the steering angle, and road and internal sensor noises by calculating an error value based on a current determined steering wheel angle value from the means for repeatedly determining steering angle values and a determined steering wheel angle value preceding the current determined steering wheel angle value from the means for repeatedly determining steering angle values;
    means for comparing a determined current error value with previously determined error values to determine a correlation between the error values; and
    means for determining that the driver is holding the steering wheel if the correlation between the error values is above a threshold value,
    wherein the means for determining the steering wheel angle value comprises a steering wheel angle-sensor.

8. A system according to claim 7, wherein the means for comparing the current determined error value with previously determined error values is based on a correlation function.

9. A system according to claim 8, wherein the correlation function is based on the product of error values summarized for a pre-determined number of repetitions.

10. A system according to claim 8, further comprising means for determining that the driver is not holding the steering wheel if the correlation between the error values is below a threshold value.

11. A vehicle comprising a system (I) according to claim 8.

12. A system according to claim 7, further comprising means for storing the determined steering wheel angles for determining the error value.

13. A system according to claim 7, wherein the means for determining the error value comprises calculation means.

* * * * *